(12) United States Patent
Chang

(10) Patent No.: US 6,484,436 B1
(45) Date of Patent: Nov. 26, 2002

(54) PREY TRAP WITHOUT USING BAIT

(76) Inventor: T. S. Chang, 235 Chung-Ho Box 8-24, Taipei (TW)

( * ) Notice: Subject to any disclaimer, the term of this patent is extended or adjusted under 35 U.S.C. 154(b) by 0 days.

(21) Appl. No.: 09/988,505

(22) Filed: Nov. 20, 2001

(51) Int. Cl.[7] ............................................. A01M 23/02
(52) U.S. Cl. ........................ 43/61; 43/62; 43/67; 43/69
(58) Field of Search ............................... 43/61, 62, 65, 43/67, 69

(56) References Cited

U.S. PATENT DOCUMENTS

| | | | |
|---|---|---|---|
| 383,972 A | * | 6/1888 | Mittler ........................... 43/61 |
| 1,453,796 A | * | 5/1923 | Hovell ............................ 43/61 |
| 1,815,541 A | * | 7/1931 | Bohannon ...................... 43/61 |
| 1,937,260 A | * | 11/1933 | Young ............................ 43/61 |
| 3,834,063 A | * | 9/1974 | Souza et al. ................... 43/61 |
| 5,329,723 A | * | 7/1994 | Liul ................................ 43/61 |
| 5,778,594 A | * | 7/1998 | Askins et al. ................... 43/61 |

FOREIGN PATENT DOCUMENTS

FR          2586900 A1   *   3/1987   .......... A01M/23/20

* cited by examiner

Primary Examiner—Charles T. Jordan
Assistant Examiner—Danielle Rosenthal

(57) ABSTRACT

A prey trap comprises a body having two supporting frames; two gates arranged on the supporting frames of a body; an actuating plate; a hanging frame connected to another side of the actuating plate; and two ropes. Each gate is connected with one end of a rope, and another end of the rope is arranged to be across the supporting frame. Each bead at the end of the rope and the hanging frame are confined by one another, and thus are in a steady position. When the actuating plate is lifted upwards to a predetermined height; the gate is at an upper end of the supporting frame. When the actuating plate is pressed and is released from the confinement of the hanging frame, the gate then drops downs rapidly and freely and further the gate and the body forms a closing condition.

6 Claims, 7 Drawing Sheets

PREY TRAP WITHOUT USING BAIT

FIELD OF THE INVENTION

The present invention relates to a prey trap, and particularly to a prey trap without needing any bait, wherein the prey trap is operated according to natural physical rule.

BACKGROUND OF THE INVENTION

Two kinds of conventional prey traps are illustrated in FIGS. 1 and 1A, FIG. 1 shows a clamp type prey trap and FIG. 1A shows a grid type prey trap.

In the prior art, the prey trap is placed on a path in which preys possibly pass through and baits are placed in the prey trap. When a prey is lured by baits and runs into the prey-trap, it will be captured by the prey trap.

However, above prior art ways need baits and thus a problem of environment protection occurs. Furthermore, clamping a prey will induce the prey to be harmed, but this is merciless and thus can not be accepted by animal protection groups. Furthermore, after the prey trap is used for a time period, it is often to be deserted. Moreover, it is often that children are harmed by the clip of the prey trap.

In other aspect, a grid type prey trap has a closed space with only one opening. Therefore, in general, preys will not enter into the prey trap so that the efficiency is low. Furthermore, the grid structure is easily inoperative due to elastic fatigue.

Therefore, the two prior prey traps have defects and thus are necessary to be improved.

SUMMARY OF THE INVENTION

Accordingly, the primary object of the present invention is to provide a prey trap, wherein a path is formed in the prey trap, and thus it cannot be found by the preys. Therefore, no bait is necessary and thus the object of environment is achieved.

Another object of the present invention is to provide a prey trap, wherein when the actuating plate is lifted upwards to a predetermined height; the gate is at an upper end of the supporting frame. When the actuating plate is pressed and is released from the confinement of the hanging frame, the gate then drops downs rapidly and freely and further the gate and body are formed as a closing condition. Therefore, the present invention is actuated by using natural rule. No clip or elastic element is used. No problem of elastic fatigue occurs. Therefore, the lifetime is long.

Another object of the present invention is to provide a prey trap, wherein adjusting the weight of each gate and the tension between the hanging frame and the bead, beads are confined below a frame seat and gates are pulled to an upper end of the supporting frame; thereby, a steady condition is retained. A surface of each bead may be one of a smooth surface and a coarse surface. Thereby, when the hanging frame pulls the bead, the bead has a preferred position; the surface has different friction coefficient based on the coarseness thereof. Thereby, when the hanging frame is confined by the bead, the sensitivity of the actuating plate is adjustable so as to match the requirement of different preys.

The various objects and advantages of the present invention will be more readily understood from the following detailed description when read in conjunction with the appended drawing.

DETAILED DESCRIPTION OF THE PREFERRED EMBODIMENTS

Figure 1:
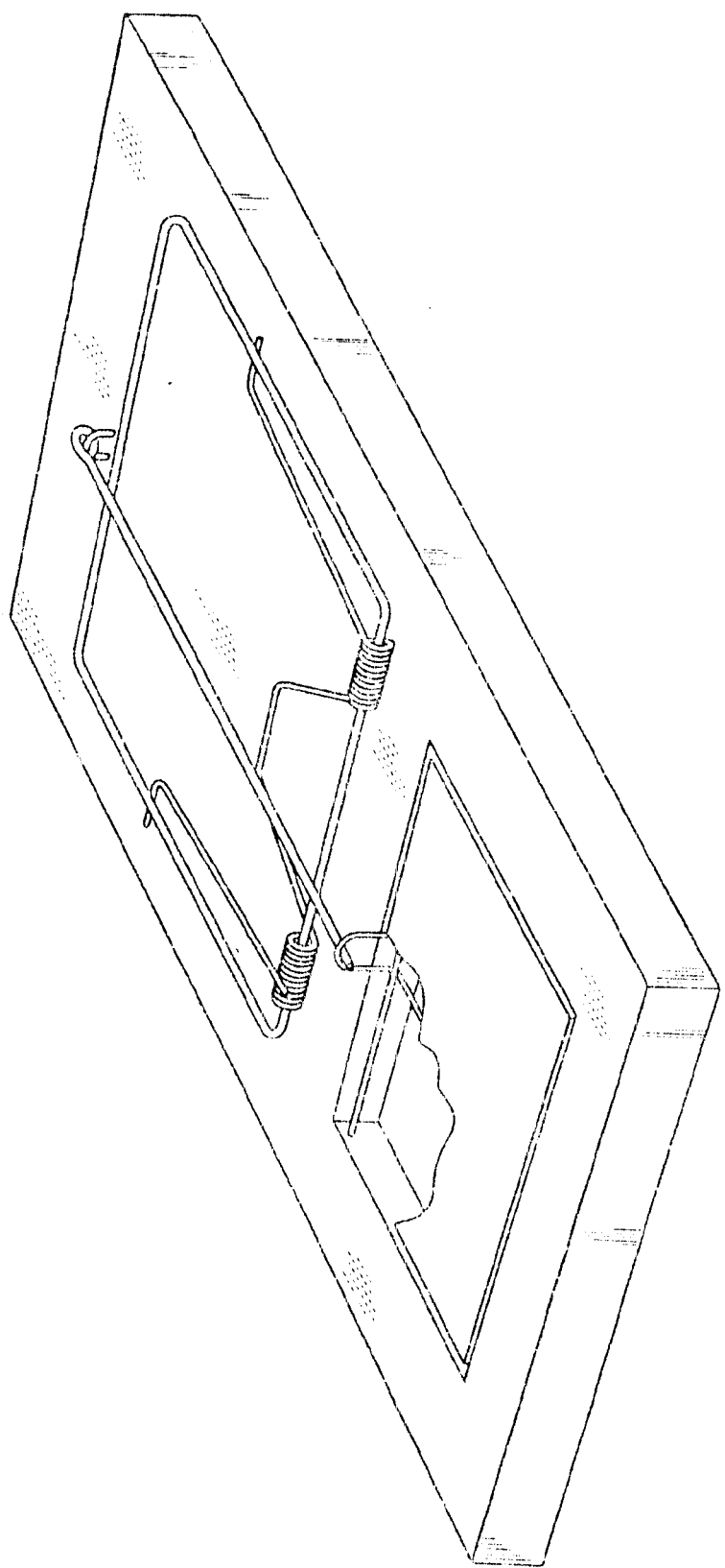
FIG. 1 is a perspective view of a conventional prey trap.
Figure 1A:
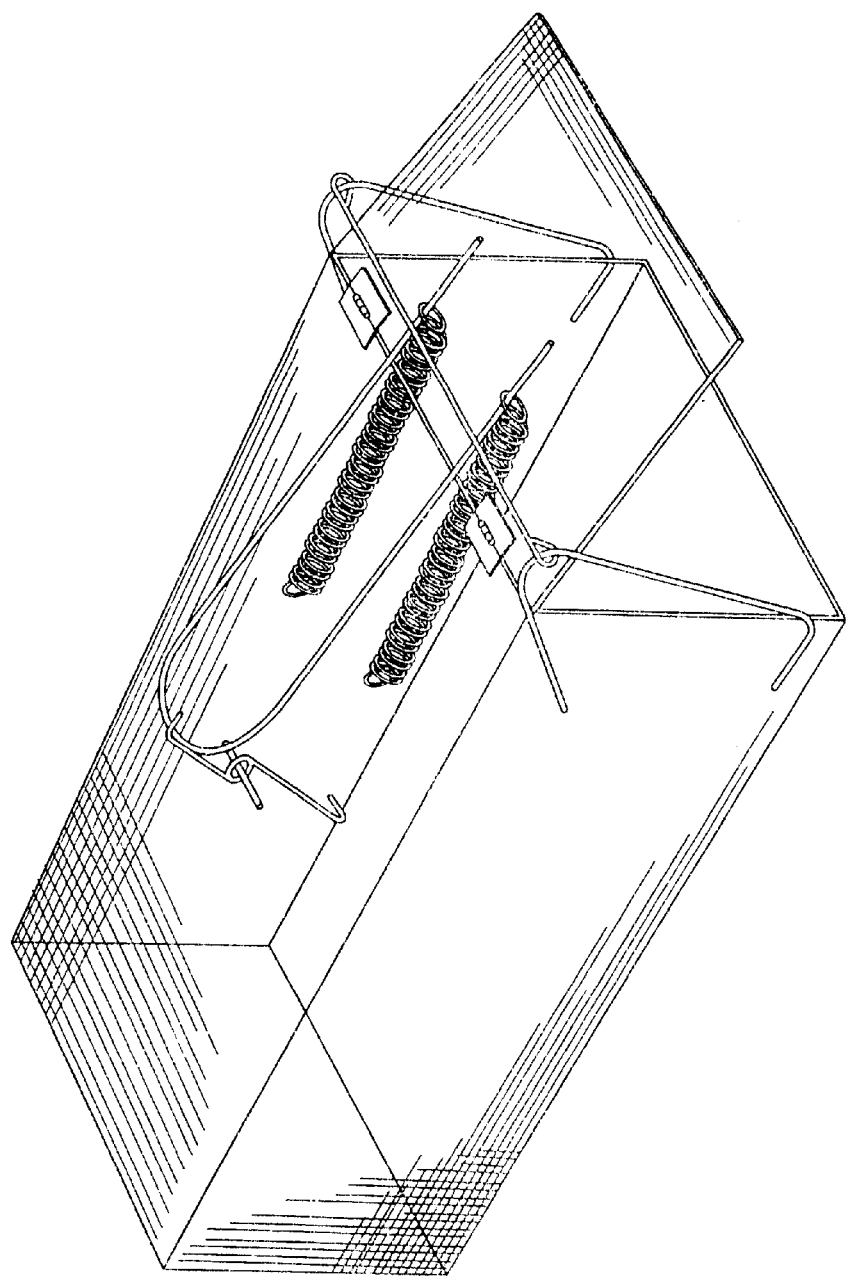
FIG. 1A is a perspective view of another conventional prey trap.
Figure 2:
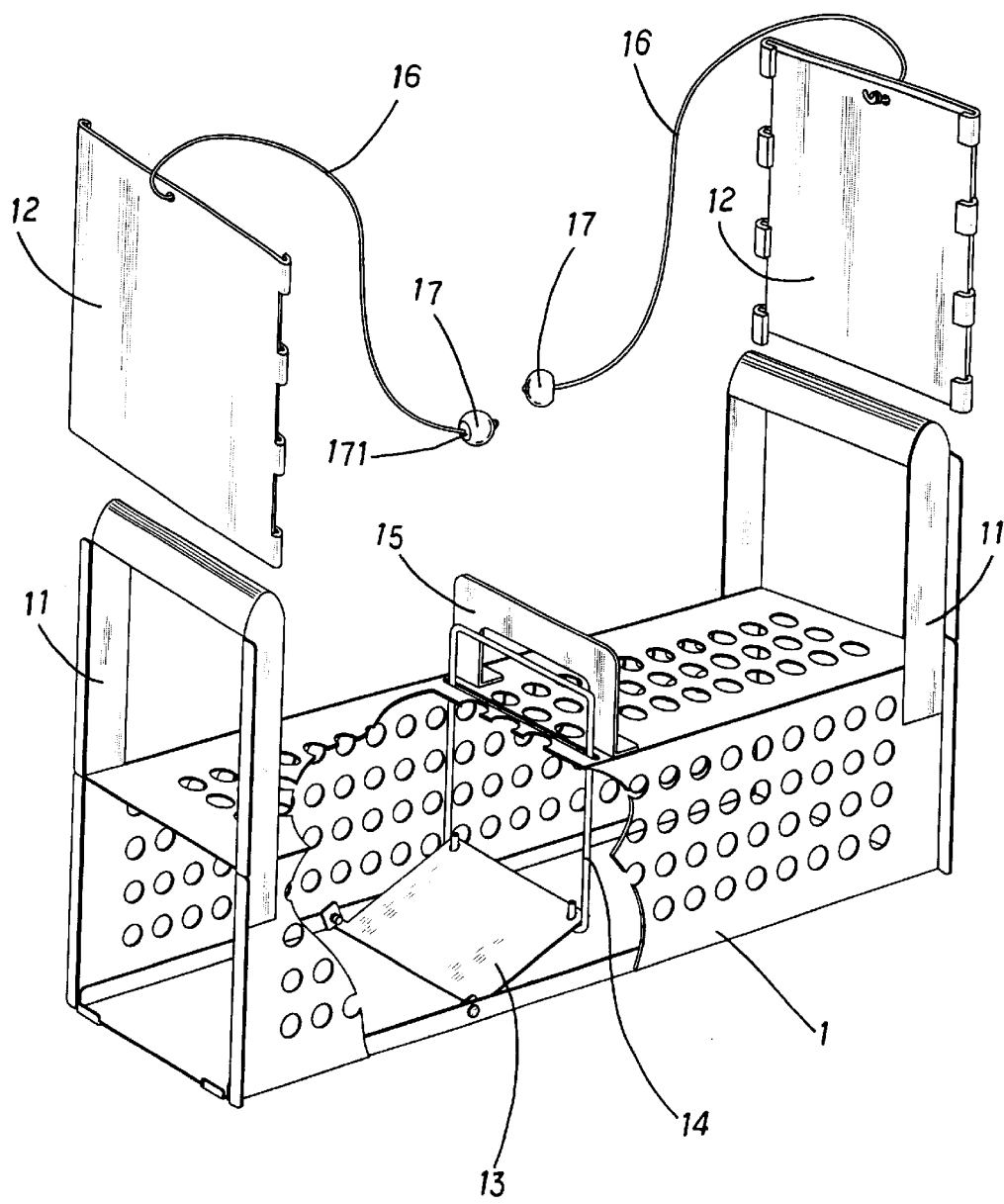
FIG. 2 is an exploded perspective view of the present invention.
Figure 3:
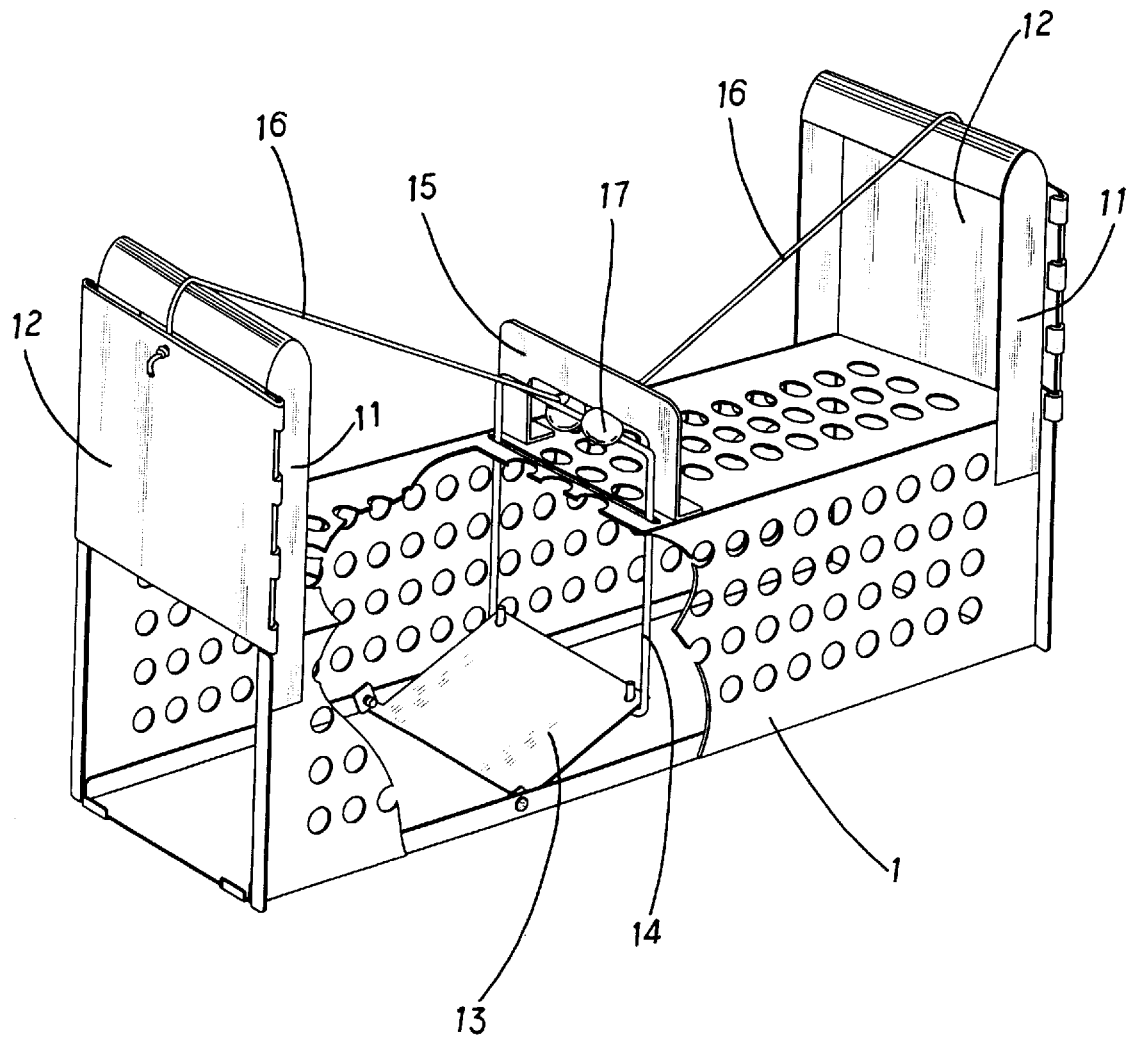
FIG. 3 is an assembled perspective view of the present invention.
Figure 5:
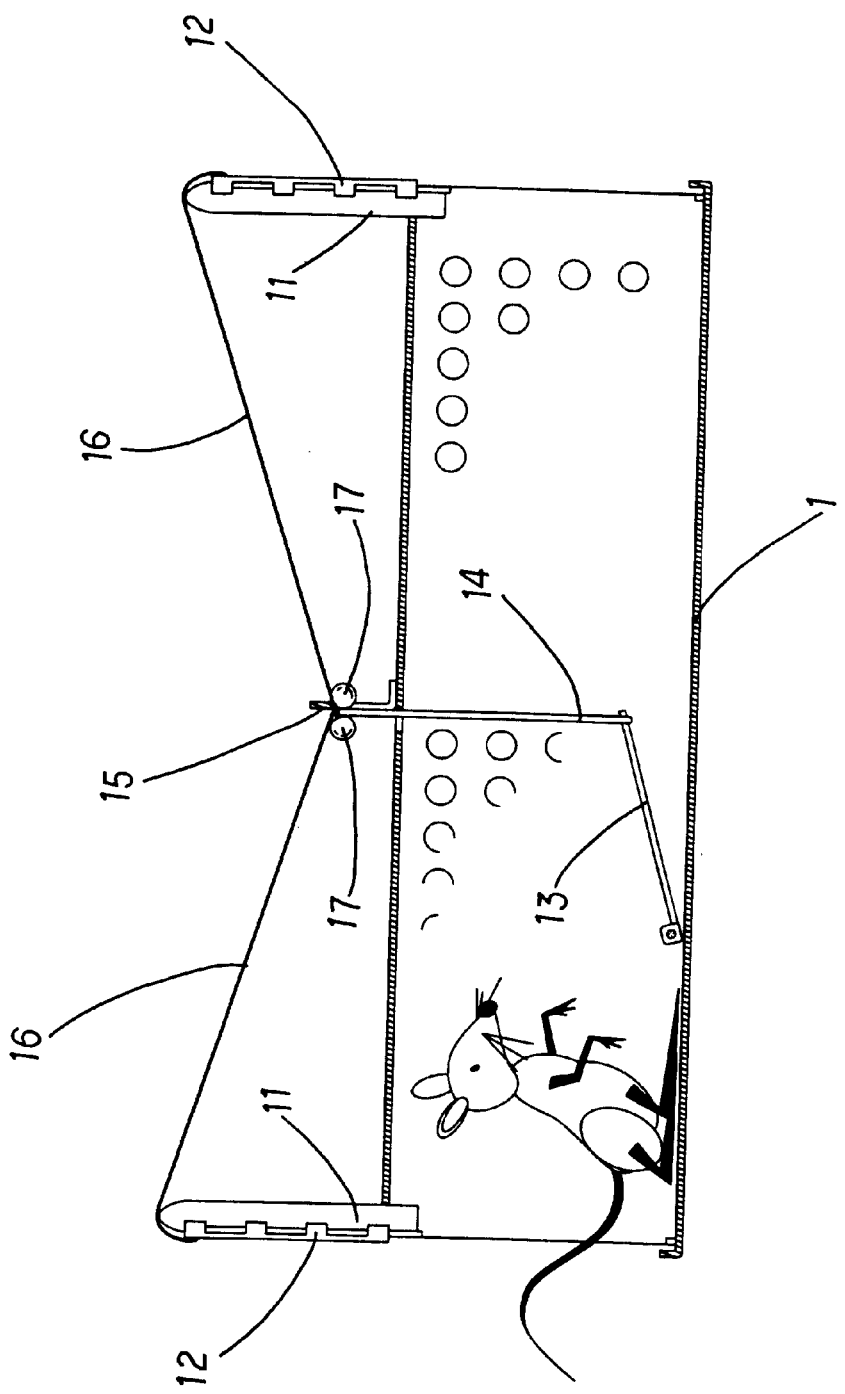
FIG. 5 shows the operation that a prey presses an actuating plate and thus the beads slide out and then releases from the confinement of the hanging frame.
Figure 6:
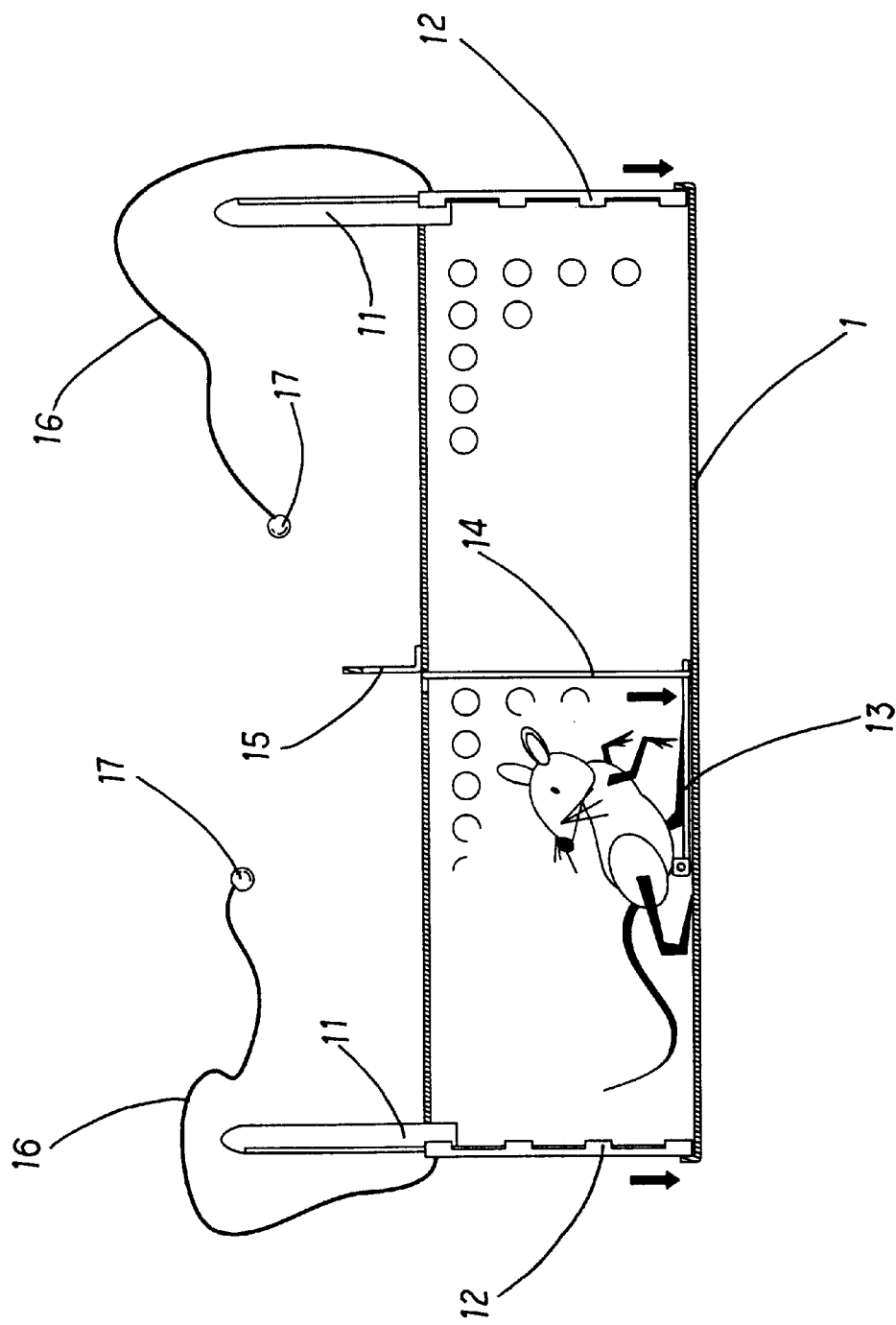
FIG. 6 is a schematic view showing that a prey is captured by the prey trap of the present invention, wherein the gates and the body forms a closed box.

Referring to FIGS. 2 and 3, the prey trap of the present invention is illustrated. In the present invention, two gates capable of sliding upwards and downwards are arranged on the lateral supporting frames 11 of a body 1. An upper side of the bottom of the body 1 is pivotally connected to the actuating plate 13. Another side of the actuating plate 13 is connected to a hanging frame 14. An upper edge of the hanging frame 14 protrudes out of an upper surface of the body 1 and is installed below a frame seat 15. The hanging frame 14 is displaceable within a predetermined range. A rope 16 serves to pull the gate 12 to slide upwards and is a highly flexible and deformable rope. An end of the rope 16 is arranged across the supporting frame 11 and then extends to be between a lower edge of the frame seat 15 and the hanging frame 14. The bead 17 at the distal end of the rope and the hanging frame 14 are confined in that position and thus in a steady position. At this moment, the actuating plate 13 is lifted upwards to a predetermined height. The gate 12 is at an upper end of the supporting frame 11 (referring to FIG. 4). When the actuating plate 13 is pressed and is released from the confinement of the hanging frame 14 (referring to FIGS. 5 and 6), the gates 12 drop downs rapidly and freely and further the gate 12 and body 1 are formed as a closing box.

Figure 4:
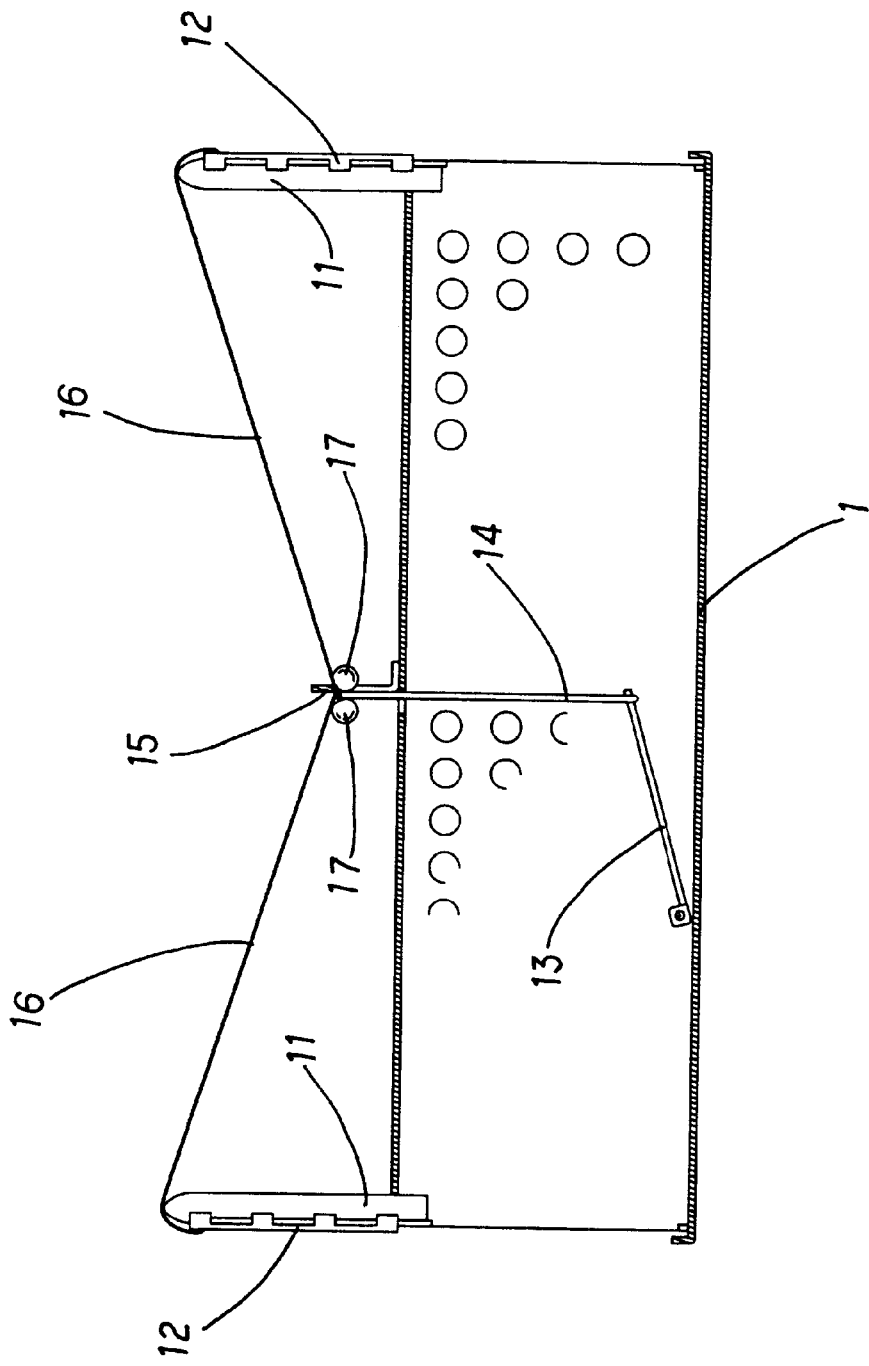
FIG. 4 is an assembled view showing that the beads and hanging frame are engaged with one another for waiting a prey.

Referring to FIGS. 2 and 4, the surface of the bead of the present invention has a cutting surface 171. The cutting surface may be a smooth surface or a coarse surface. Thereby, when the hanging frame 14 pulls the bead 17 upwards, the bead 17 may be located at a preferred position. Furthermore, the cutting surface has a different friction coefficient so that when the hanging frame 14 is confined by the bead 17, a mistake action can be prevented and a different actuating force can be acquired. Thereby, the sensitivity of the actuating plate 13 can be adjusted to match the requirement for capturing different preys.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A prey trap comprising:
   a body having two supporting frames at two opposite lateral sides;

two gates capable of sliding upwards and downwards being arranged on the supporting frames of the body;

an actuating plate having a side pivotally connected to an upper side of a bottom of the body;

a hanging frame connected to another side of the actuating plate;

and an upper edge of the hanging frame protruding out of an upper surface of the body and being installed below a frame seat; the hanging frame being displaceable in a predetermined range; and two ropes; each gate being connected with one end of a rope, and another end of each rope being connected with a bead, each gate being arranged to be across the supporting frame and then extending to be located between a lower edge of the frame seat and an upper side of the hanging frame;

wherein each bead at the end of the rope and the hanging frame are confined by one another, and thus are in a steady position; when the actuating plate is lifted upwards to a predetermined height, the gate is at an upper end of the supporting frame; when the actuating plate is pressed and is released from the confinement of the hanging frame, the gate then drops downs rapidly and freely and further the gate and body are formed as a closing condition.

2. The prey trap as claimed in claim 1, wherein adjusting a weight of each gate and pulling tension between the hanging frame and the bead, the beads are confined below the frame seat and the gates are pulled to an upper end of the supporting frame; thereby, a steady condition is retained.

3. The prey trap as claimed in claim 1, wherein a surface of each bead is one of a smooth surface and a coarse surface; the surface has a friction coefficient responsive to the coarseness thereof; thereby, when the hanging frame is confined by the bead, the sensitivity of the actuating plate is adjustable to match the requirement for capturing different preys.

4. The prey trap as claimed in claim 1, wherein the weight ratio of the actuating plate, beads and gates is adjustable responsive to the weight and volume of the prey.

5. The prey trap as claimed in claim 1, wherein the bead has a cut surface at a connection of the bead and hanging frame for providing a confining to the bead and the hanging frame.

6. The prey trap as claimed in claim 1, wherein the ropes are made of flexible and deformable material.

* * * * *